UNITED STATES PATENT OFFICE.

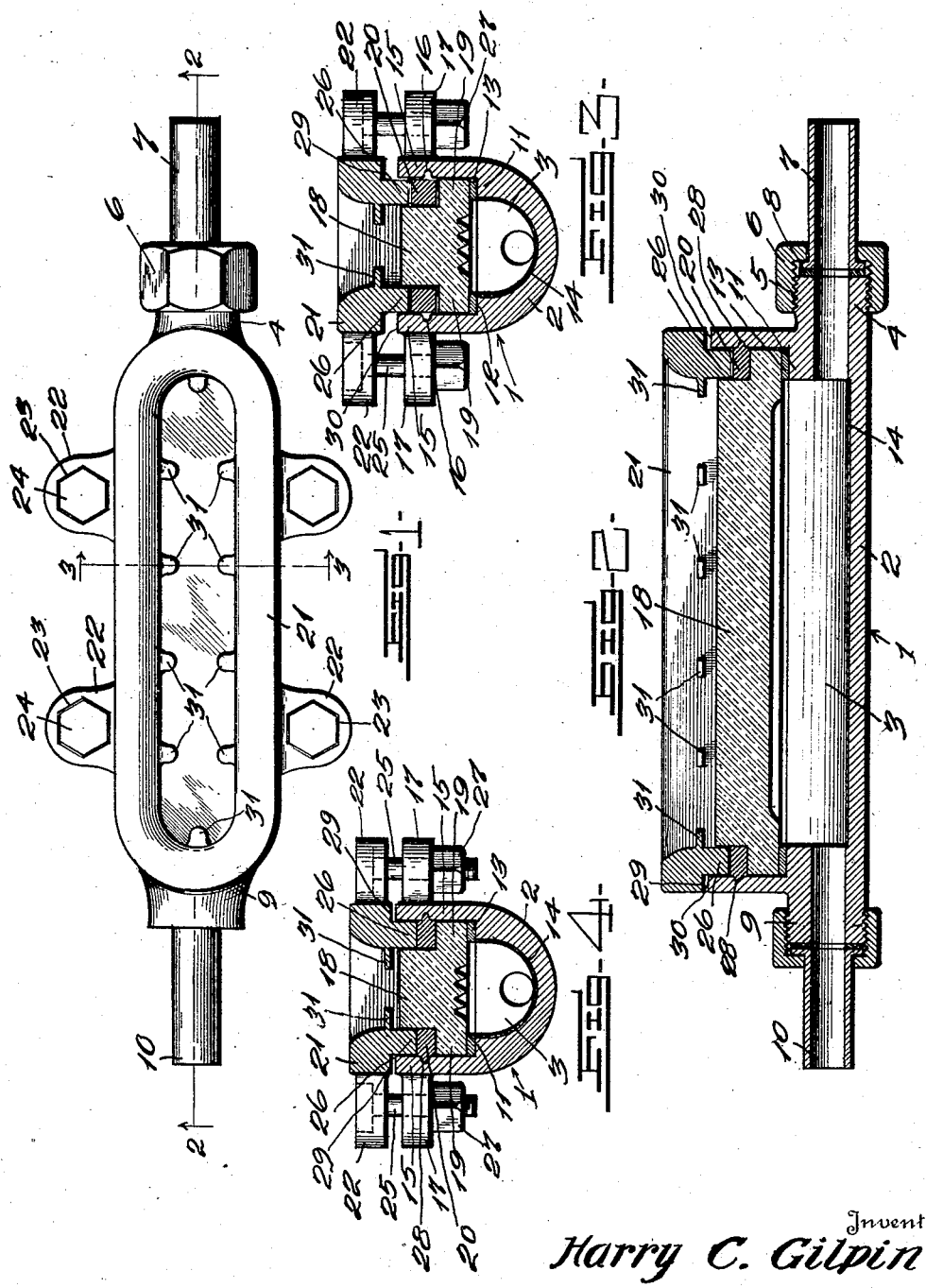

HARRY C. GILPIN, OF ELKINS, WEST VIRGINIA.

WATER-GAGE.

1,250,300.  Specification of Letters Patent.  Patented Dec. 18, 1917.

Application filed April 6, 1916. Serial No. 89,380.

*To all whom it may concern:*

Be it known that I, HARRY C. GILPIN, a citizen of the United States, residing at Elkins, in the county of Randolph and State of West Virginia, have invented certain new and useful Improvements in Water-Gages, of which the following is a specification.

This invention relates to certain new and useful improvements in water gages of that class designed more particularly for determining the height of water within steam boilers and having special provision for preventing leakage.

The present invention has for its object, among others, to provide an improved water gage of this general character having provision for greater safeguard against leakage and specially constructed so that the compressible washer may be further compressed after repeated use.

The invention has for a further object to provide simple and efficient means to guard against accident by the blowing out of the sight-glass and scattering of the parts thereof when broken.

I aim further at improvements in the details of construction whereby the ready assemblage of the parts is assured together with the aforementioned provision for compensating for wear in the washer.

Other objects and advantages of the invention will hereinafter appear and the novel features thereof will be particularly pointed out in the appended claims.

The invention is clearly illustrated in the accompanying drawings which, with the numerals of reference marked thereon, form a part of this specification and in which:

Figure 1 is a face view of a water gage constructed in accordance with my invention;

Fig. 2 is a substantially central longitudinal section through the same, as on the line 2—2 of Fig. 1;

Fig. 3 is a cross-section, as on the line 3—3 of Fig. 1;

Fig. 4 is a view similar to Fig. 3 showing the relation of the parts after the compressible washer has been compressed.

Like numerals of reference indicate like parts throughout the several views.

Referring to the drawings:

1 designates a casing, preferably of metal, having a curved extension 2 and a passageway 3 for the circulation of the water therethrough.

At one end this casing is provided with a nipple 4, screw threaded as at 5 for engagement of the threaded coupling 6 to engage the extension 7, a gasket 8 or the like being interposed, as usual.

The other end of the casing is provided with a nipple 9 which may be similar to the nipple at the other end or it may be plain as shown and adapted to be inserted in the usual form of packing gland on the boiler, having an extension 10 for this purpose. This, however, is immaterial.

The casing is formed with internal shoulders 11 and 12 upon which is adapted to be seated a packing or washer 13, as shown in Figs. 2, 3 and 4.

The inner wall of the chamber 3 may be coated or provided with a lining, as seen at 14, to serve as a reflector.

The inner faces of the opposite side walls 15 of the casing are provided with longitudinally disposed grooves or channels 16, as shown in Figs. 2, 3 and 4 for a purpose soon to be described.

The casing 1 is further provided with lugs 17 upon opposite sides thereof, as shown in Figs. 1, 3 and 4.

18 is the sight-glass. It is inserted within the casing 1, resting upon the gasket or washer 13, and is itself offset at opposite sides as shown at 19, forming horizontal shoulders upon which the compressible gasket or gaskets 20 may be supported. These offsets, as will be noticed upon reference to Figs. 3 and 4, are arranged opposite the longitudinal grooves or channels 16 in the adjacent walls of the casing.

21 is the cover or frame by which the sight-glass is retained in place and by means of which the gaskets or packing 20 may be compressed. This cover or frame is provided with lugs 22 the upper faces of which are countersunk as seen at 23 to receive the heads 24 of bolts 25.

In assembling the parts the gasket or washer 13 is placed in position upon the shoulders 11 and 12 and then the sight-glass 18 is placed within the casing, resting upon said gasket. Next the gasket or compressible packing 20 is placed in position upon the shoulders of the sight-glass, and then the frame or cover 21 is placed in position with its depending flange 26 resting upon the compressible gasket or packing 20, as seen in Fig. 3. The bolts 25 are then applied, the heads 24 thereof engaging in the sockets 23 of the lugs 22, and nuts 27 are applied to their threaded ends and turned up until the parts are brought from the position in which they are seen in Fig. 3 into the position in which they are seen in Fig. 4. As pressure is applied the compressible packing 20 is gradually compressed until portions thereof are forced outward into the grooves or channels 16, as seen at 28 in Fig. 4. The forcing of this compressible packing outward into these channels or grooves serves to more securely safeguard against leakage so that all possibility of any leak is avoided.

Upon reference to Fig. 4 it will be noted that the depending portion of flange 26 of the cover or frame 21 is of such length that when the packing 20 is compressed as shown in said figure the shoulders 29 at the under sides of such depending portions 26 are still out of contact with the adjacent face 30 of the casing 1 so that the provision is left for compressing the packing further should occasion arise.

The sight-glass in devices of this character occasionally gets broken, from one cause or another, and in order to prevent injury from the flying pieces of glass and to retain the glass within the casing and frame, I provide said frame with inwardly extended lugs 31, as seen in the different views, said lugs being arranged upon opposite sides and at each end of the inner walls of the frame. By this means should the glass become broken the lugs 31 will serve to prevent the glass being blown out as will be readily understood.

What I believe to be new and desire to secure by Letters Patent, is:—

1. In a water-gage, a casing, a sight-glass therein, and a sight-glass retaining frame having inwardly projecting lugs adapted to extend over said glass, said lugs being positioned in the frame so as to be raised above the face of the sight glass.

2. In a water gage, a casing having side walls provided with grooves upon their inner faces, a sight-glass within said casing and offset at its opposite edges, a compressible packing in said offsets, said packing being confined in the groove formed by the offset of the glass and means for retaining said sight-glass in position and compressing said packing into said grooves.

3. In a water gage, a casing having side walls provided with grooves upon their inner faces, a sight-glass within said casing and offset at its opposite edges, a compressible packing in said offsets, said packing being confined in the groove formed by the offset of the glass and means for retaining said sight-glass in position and compressing said packing into said grooves, said glass retaining means having projections extending over the glass.

In testimony whereof I affix my signature in the presence of two witnesses.

HARRY C. GILPIN.

Witnesses:
J. ED KILDOW,
DAVID WILSON.

Copies of this patent may be obtained for five cents each, by addressing the "Commissioner of Patents, Washington, D. C."